United States Patent [19]

Anderson

[11] Patent Number: 5,050,820
[45] Date of Patent: * Sep. 24, 1991

[54] INTERLOCKING STRUCTURAL MEMBERS EMPLOYING TRIPLE INTERFITTING WEDGE

[75] Inventor: Robert E. Anderson, Huntington Station, N.Y.

[73] Assignee: Grumman Aerospace Corporation, Bethpage, N.Y.

[ * ] Notice: The portion of the term of this patent subsequent to Jan. 9, 2007 has been disclaimed.

[21] Appl. No.: 312,984

[22] Filed: Feb. 21, 1989

[51] Int. Cl.$^5$ .............................. B64C 1/06; F16B 2/14
[52] U.S. Cl. ..................................... 244/131; 403/374
[58] Field of Search ................ 244/131, 132; 403/376, 403/374, 267

[56]  References Cited
U.S. PATENT DOCUMENTS 19,945   7/1858  Nowlan ................................ 403/267
3,160,967 12/1964 Nichols ............................... 403/374
3,764,177 10/1973 Woodward .......................... 403/374

Primary Examiner—Charles T. Jordan
Attorney, Agent, or Firm—Pollock, VandeSande & Priddy

[57] ABSTRACT

The invention relates to an expansion fastener device that secures two interlocking members together. The device includes a parallelepiped receptacle having slits along opposite ends. The receptacle is inserted through the interlocking members and triple wedges are driven into the receptacle. The triple wedges includes a first wedge having tapers in the vertical direction and its insertion into receptacle causes only vertical expansion of the receptacle. A pair of horizontally tapered wedges are inserted into the receptacle alongside the first wedge and they cause only horizontal expansion of the receptacle. Utilization of the invention reduces stress points as created by conventional rivets.

8 Claims, 4 Drawing Sheets

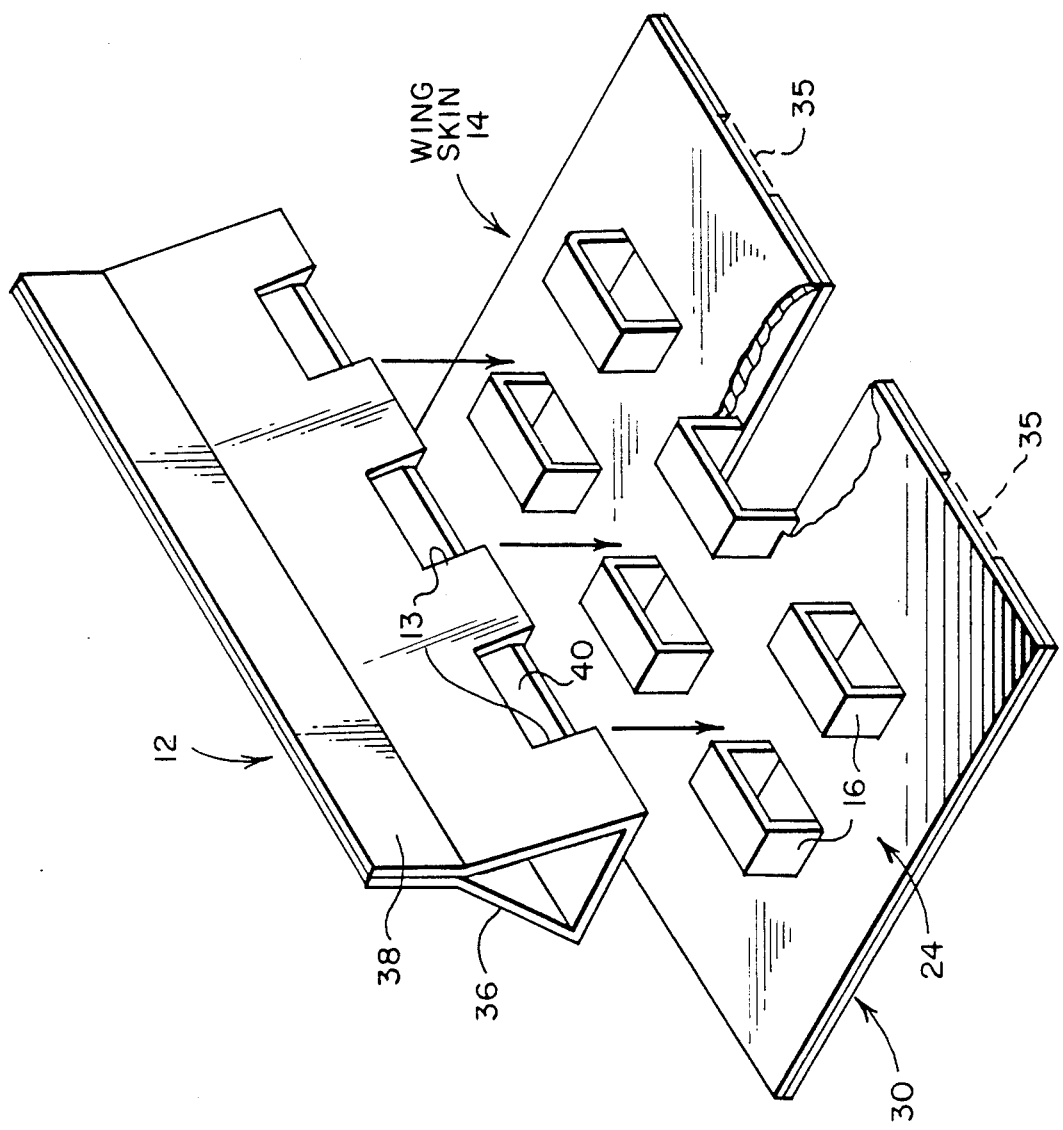

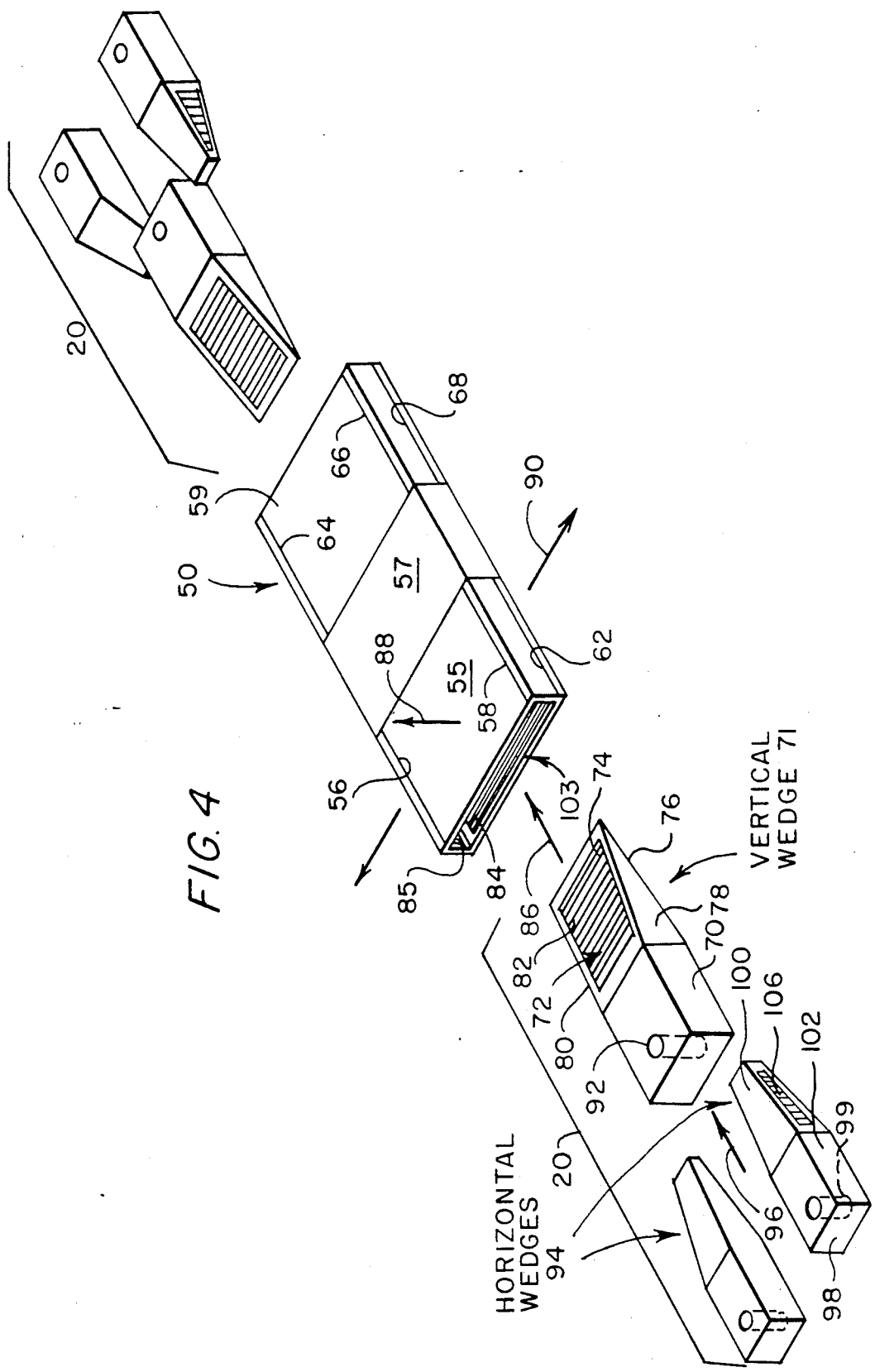

INTERLOCKING STRUCTURAL MEMBERS EMPLOYING TRIPLE INTERFITTING WEDGE

FIELD OF THE INVENTION

The present invention relates to a fastenerless joint, and more particularly to such a joint for composite aircraft structures.

BRIEF DESCRIPTION OF THE PRIOR ART

In many fabrication applications laminated structures are attached to support structures by common fastening techniques. In one particular application, composite laminated aircraft wing skins are attached to a support substructure by means of rivets. Within the aircraft environment this creates several problems. In the first place, the rivets passing through the various plies of the laminated structures create stress forces which could cause rupture and ultimate destruction of the aircraft.

In modern fabrication techniques for composite aircraft skins, fuel or other liquids are often contained within the skin so that the aircraft structure itself creates a reservoir for the fluid. A serious problem with current construction techniques utilizing fasteners is the presence of leaks where rivets penetrate the composite laminate.

For these and other reasons, it would be highly desirable to create a mechanical joint between aircraft composite laminated skin structures and support subassemblies without the utilization of discrete fasteners.

BRIEF DESCRIPTION OF THE INVENTION

The present invention utilizes a triple wedge assembly for mechanically interlocking a composite laminate wing skin structure to a support substructure.

Hollowed projections are formed in rows from the wing skin laminate and these receive mating recesses in a composite wing substructure so that interdigitation of the wing skin structure and support substructure results. The interdigitating members are hollow so that a plurality of transversely positioned triple wedges may be slid through the interdigitating members which experience independent horizontal and vertical expansion from the wedges thereby locking the members together and strongly resisting delamination which often occurs along a plane between the wing skin structure and the support substructure of conventional assemblies.

Further advantages of the present invention relate to automated precut material use which lends itself to rapid repeatable production and reduction of layup time. The tooling required is relatively uncomplicated, which serves as a distinctive economic advantage of the invention.

BRIEF DESCRIPTION OF THE FIGURES

The above-mentioned objects and advantages of the present invention will be more clearly understood when considered in conjunction with the accompanying drawings, in which:

FIG. 3 is a disassembled view of a wing skin structure and support substructure in accordance with the present invention;

FIG. 4 is a perspective view of the triple wedge and receptacle locking means as employed in the present invention.

DETAILED DESCRIPTION OF THE INVENTION

Figure 1:
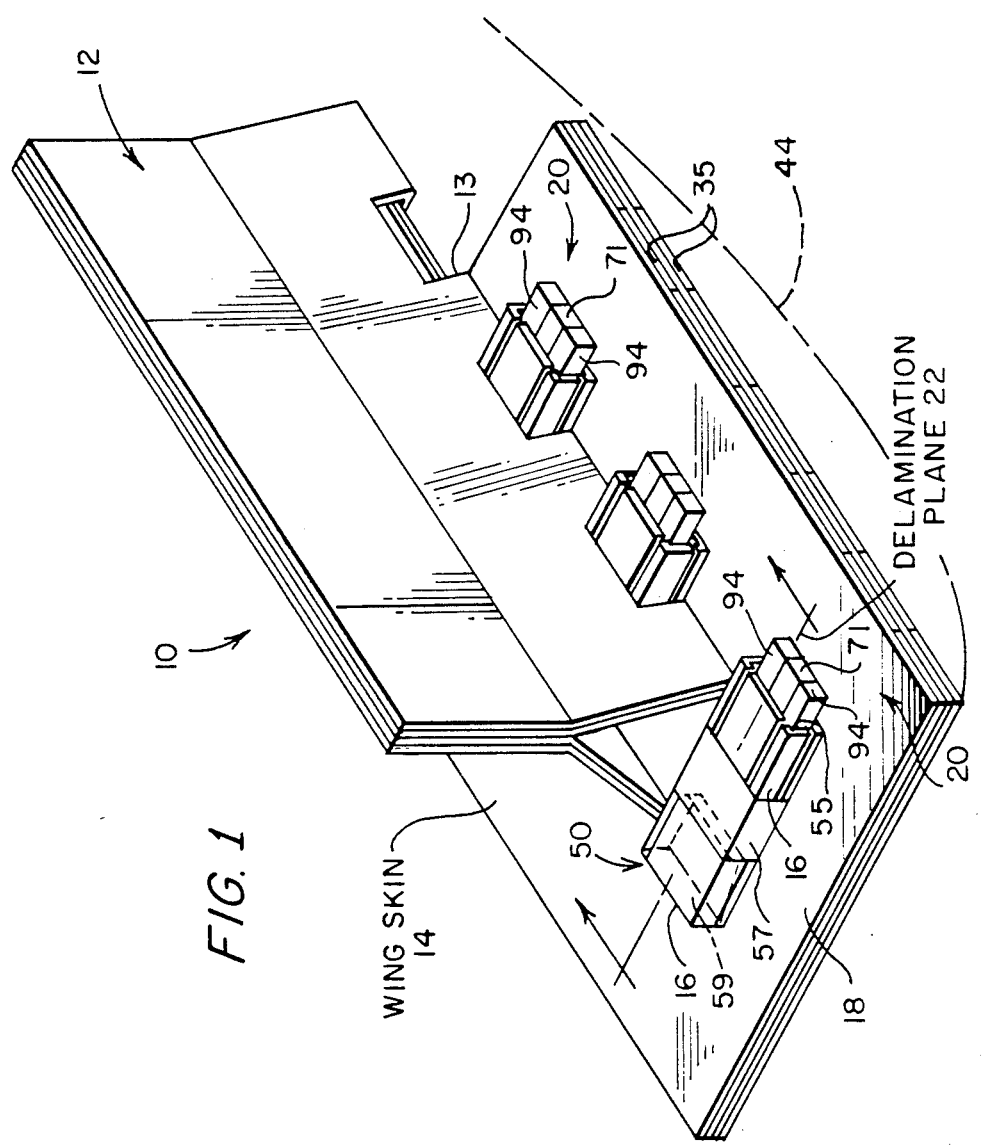
FIG. 1 is a perspective view illustrating interlocking engagement between a wing skin structure and support substructure in accordance with the present invention.

Reference is made to FIG. 1 wherein interlocking engagement between a wing skin structure and support substructure is illustrated in a manner similar to that of my co-pending application Ser. No. 306,199, filed Aug. 29, 1989, now U.S. Pat. No. 4,909,659. The interlocking members are generally indicated by reference numeral 10 and are seen to include a wing support substructure 12 secured to a wing skin structure 14. In order to achieve the interlocking engagement between members 12 and 14, hollowed projections 16 are formed in the wing skin structure 14 and for illustrative purposes are indicated as two parallel spaced rows extending longitudinally. A greater number of rows could, of course, be present. The wing support substructure 12 has, along a triangular base portion, slots 13 formed therein so that the spacing between the recesses is the same as the spacing between longitudinally extending adjacent projections. The slots 13 receive corresponding projections 16 so that the engaging portions form interdigitations. The triangular base portion of the substructure 12 and the projections 16 are hollowed so that a transversely positioned wedge assembly 20 can slide through transversely aligned projections to secure interlocking engagement between the substructure 12 and the projections 16. Single wedge securement is disclosed in my copending application Ser. No. 131,699, filed Dec. 11, 1987, now U.S. Pat. No. 4,904,109, and utilization of a double wedge assembly is disclosed in my copending application Ser. No. 306,196, filed Feb. 6, 1989, now U.S. Pat. No. 4,892,435, issued Jan. 9, 1990. The particular improvement of the present invention relates to additional advantages of a novel triple wedge which is discussed in greater detail in connection with FIG. 4. If the wing skin structure 14 and the wing support substructure 12 were connected in conventional fashion by rivets, a delamination plane would exist at the interface between wing skin structure and support substructure, as indicated by reference numeral 22. When rivet construction is used, a danger exists that sufficient stress upon the wing skin structure will delaminate or separate the wing skin structure 14 from the wing support substructure 12. The transverse orientation of the wedges 20 along the longitudinal interface between wing skin structure 14 and wing support substructure 12 greatly increases an aircraft's ability to resist delamination.

It is to be noted that the wing support substructure 12 is shown mounted in longitudinal offset relationship to the wing skin structure 14 so that details of the invention are better illustrated. In actual utilization of the invention, the substructure 12 would be shifted to more completely overlie the wing skin structure 14.

Figure 2:
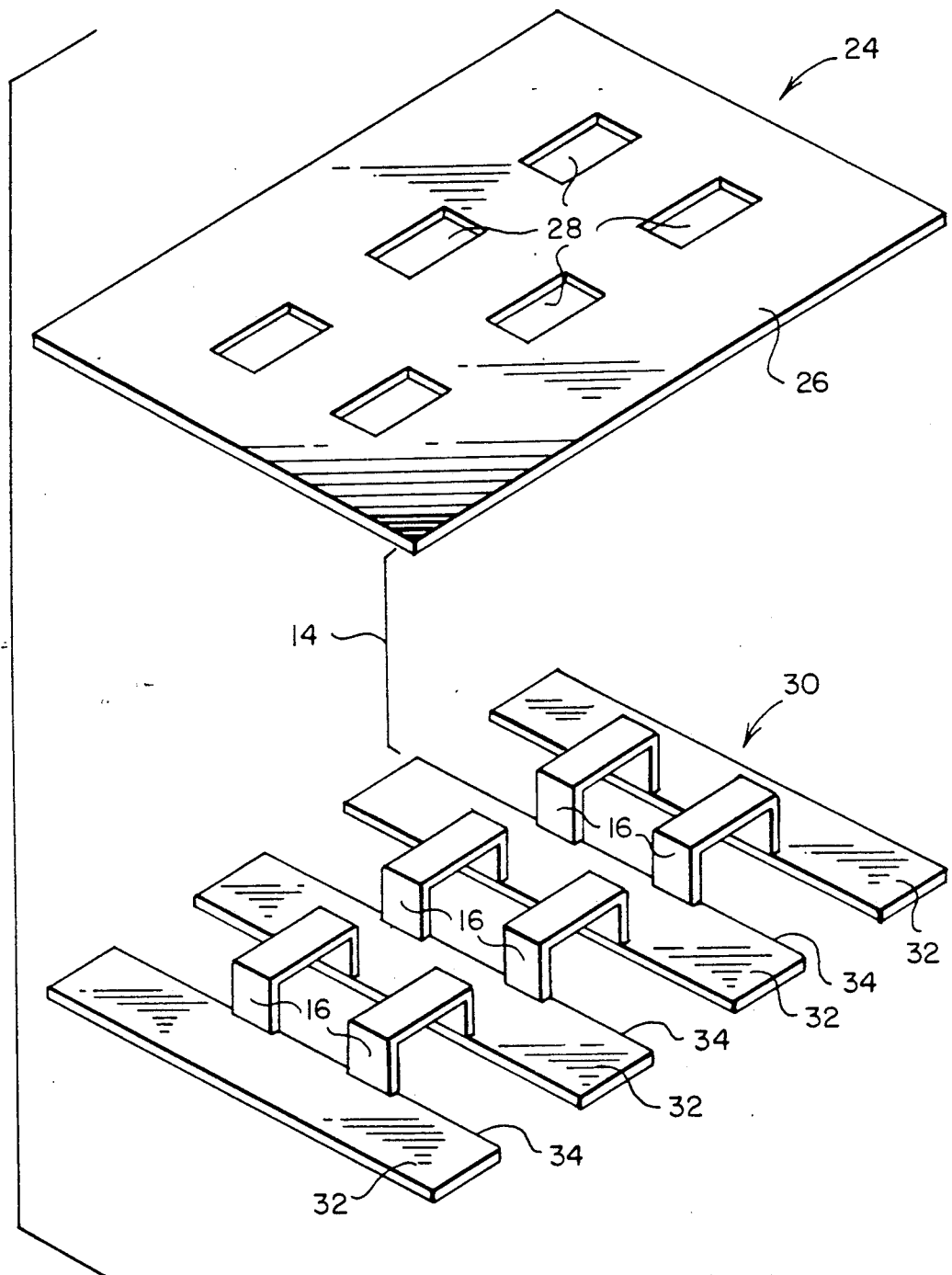
FIG. 2 is a disassembled view of top and bottom ply members constituting an elementary wing skin structure.

In order to better appreciate the construction of the present invention, reference is made to FIG. 2 wherein a top ply for the wing skin structure is generally indicated by reference numeral 24. The ply may be fabricated from a Fiberglass sheet 26 or from a number of conventional composite materials. For simplicity of explaining the invention, only six spaced openings 28 are illustrated. These openings appear as two parallel rows, the rows having a series of transversely aligned opening pairs of rectangular shape. A bottom ply 30 is fabricated from a sheet 32 of appropriate material such as Fiberglass or selected composite material. The sheet 32 is interrupted by parallel spaced longitudinal medial openings 34 bridged by integrally formed connecting projection pairs 16 spaced to be in registry with corresponding openings 28.

By lowering the top ply 24 over the bottom ply 30 so that projections 16 respectively project upwardly through corresponding openings 28, the two plies become geometrically locked, as indicated by the completed wing skin structure 14 in FIG. 3. As is the case in existing composite aircraft laminated structures, the individual plies are impregnated with resin and cured. Conventional pre-impregnated resins may be successfully used in accordance with known practices.

It should be observed that FIGS. 2 and 3 illustrate the wing skin structure as being fabricated from a single top and bottom layer. However, this has been done to simplify the explanation of the invention. In order to achieve desired structural strength, it is anticipated that several sets of top and bottom layers will be necessary. Accordingly, FIG. 1 has been illustrated for an example where two sets of top and bottom plies have been employed.

If the wing skin is desired to be of uniform thickness, strips 35 are positioned in the medial openings 34, as indicated in FIGS. 1 and 3.

The final construction of the invention will now be explained in connection with FIG. 3. The wing support substructure 12 is shown as fabricated from two plies of resin-impregnated fabric which, like the wing skin structure, may be made of Fiberglass or other suitable composite, the layers being folded over one another to form the flat portion 38. The lower portion of the wing support structure is formed as a closed, hollowed triangular portion, indicated by reference numeral 36 which includes a base section 40.

In order to fabricate the composite wing skin structure and composite wing support substructure as rigid load-supportable members, the resin impregnation of the composite fabrics must be cured. In this regard the wing skin structure 14 is cured separately from the support substructure 12 and then they are assembled. A triple wedge 20 is passed through each respective projection 16 to lock the wing skin structure and support substructure together.

In order to increase the substructure's resistance to shear forces, a strip of material (not shown) may be laced through the flat portion 38 in a manner detailed in my co-pending U.S. patent application Ser. No. 53,199, filed May 22, 1987, now U.S. Pat. No. 4,813,202, issued Mar. 31, 1989.

The utilization of transverse locking means for securing composite wing skin structure and support substructure is disclosed in my previously mentioned co-pending U.S. patent application Ser. No. 306,199, filed Aug. 29, 1989, now U.S. Pat. No. 4,909,659. The thrust of the present invention is the utilization of a triple wedge assembly in combination with an expandable receptacle for achieving the transverse locking of wing skin to support substructure. In my last-mentioned co-pending application, the wing skin and support substructure are held together by a simple trapezoidal locking bar which slides through projections 16, which are likewise formed in a trapezoidal cross section. The utilization of a simple locking bar is particularly appropriate where the wing skin and support substructure (both resin-impregnated) are co-cured. When this is accomplished, the bonding between the wing skin and support substructure is significant and the locking bar provides additional securement.

However, the present invention is intended for applications where the wing skin structure and support substructure are intended to be separately cured and, therefore, the locking of these structures together must rely totally upon triple wedges 20. The advantage of the present locking arrangement is that the wing skin structure and support substructure may be separately fabricated and assembled later on. Likewise, it is possible to remove the wedges 20 and disassemble the wing skin structure from the support substructure if this becomes necessary.

Referring back to FIG. 1 it will be seen that each pair of aligned transverse projections 16 receives a parallelepiped-shaped receptacle 50. The triple wedges 20 are actually force fitted into the opposite ends of the receptacle to expand the receptacle walls into engagement with the projections 16, thereby locking the wing skin structure 14 to the support substructure 12.

In greater detail, FIG. 4 indicates that the receptacle 50 is characterized by two opposite end sections 55 and 59 and a central section 57. The end section 55 includes slotted edges 56, 58, 60 and 62 to allow vertical and horizontal expansion of the receptacle walls, outwardly, after insertion of the triple wedges 20. The central section 57 includes no such slotted edges. Like section 55, the end section 59 includes slotted edges 64, 66, and 68 as well as a fourth remaining slotted edge, hidden from view.

The triple wedge 20 includes a single centrally disposed wedge 71 for vertical expansion and which is preferably fabricated from a solid body and includes a parallelepiped section 70 extending to a tapered section 72. The tapered section 72 includes an inclined upper surface 74 and a lower inclined surface 76 as well as side walls 78 and 80. The upper and lower surfaces 74 and 76 include ridges 82 to engage corresponding ridged surfaces 84 on interior upper and lower walls of end sections 55 and 59 of receptacle 50.

Wedge 71 performs only vertical expansion (88) of the receptacle 50 when it is initially driven (86) into the receptacle. Of course, the harder the wedge 71 is driven into the receptacle 50, the greater the vertical expansion will be.

In order to effect independent horizontal expansion of the receptacle 50, a pair of wedges 94 is driven in direction 96 into receptacle opening 103 alongside wedge 71. The degree of horizontal expansion of receptacle 50 is governed by the extent to which the wedges 94 are driven into the receptacle opening 103. The wedges 94 include an outward parallelepiped section 98 extending to a section 100 inclined slightly to prevent vertical interference with opening 103 which would upset the independent vertical expansion of receptacle 50 by wedge 71. Each outward sidewall 102 includes a rippled section 106 that becomes engaged by a mating rippled vertical wall 85 in wedge 71. It should be pointed out that rippled sections 106 are tapered inwardly so that an interference fit between the rippled sections and wall 85 causes horizontal expansion (90) of receptacle 50.

As previously mentioned, a similar triple wedge 20 is employed on the right illustrated end of the receptacle and its insertion causes the vertical and horizontal independent expansions of end section 59.

As will be appreciated from the above-discussed invention, a significant advantage of the present invention is the capability of independently causing vertical expansion and horizontal expansion of the inventive fastener device. This is significant when compared with the prior art where material deformation may cause a greater expansion in one or the other direction to an undesirable and possibly material-damaging degree.

The advantage of the triple wedge assembly over the double wedge assembly disclosed in my copending application Ser. No. 306,196, filed Feb. 6, 1989, now U.S. Pat. No. 4,892,435, issued Jan. 9, 1990 is the ability of the wedges 94 to assume individual insertion depths into the receptacle thereby obviating the necessity of perfectly symmetrical placement of the horizontal wedges 94 and the vertical wedge 71. Thus, the triple wedge assembly of the present invention exhibits higher tolerance for non-uniform offset centers for the wedges.

Referring to FIG. 1, in order to assemble a wing skin structure 14 to a support substructure 12, receptacles 50 are inserted through each pair of transversely aligned projections 16 after substructure 12 and wing skin 14 are joined. The central section 57 is medially disposed in the space 18 between each of the projection pairs while the end sections 55 and 59 are received within corresponding projections 16. Each triple wedge 20 is driven into a corresponding end section in the direction indicated by reference numerals 86 and 96. Upon insertion of wedges 20, a corresponding end section will vertically expand (88) and horizontally expand (90). A press fit will therefore result between the receptacle 50 and each pair of corresponding retaining projections 16. After the triple wedges 20 have been inserted, the wing skin structure 14 is securely fastened to the support substructure 12. However, if disassembly of the wing skin structure from the support structure becomes necessary, the wedges 20 may be pulled from the receptacles 50. In order to expedite such removal, bores 99 may be formed in wedges 94 to permit the insertion of a pulling tool (not shown). A similar bore 92 is formed in wedge 71 for the same purpose. By utilizing triple wedges 20, close tolerance fits are achieved between the wing skin structure and support substructure so that minute sliding therebetween is inhibited. As a result, deformation of the mating parts is minimized. The close fit tolerance also avoids fastener bending which is not uncommon in high speed aircraft utilizing rivet construction. It should be further noted that the large rectangular interface area between the base of the support substructure 14 and wing skin 12 resists buckling as compared to joints where rivets or the like are used.

In a finally assembled aircraft, the wing support substructure 12 and projections 16 are positioned internally of the wing. The underside of the wing skin structure 14, opposite the surface illustrated, will form the exterior surface of the wing skin. The utilization of transverse locking means, namely the triple wedges 20 within projections 16, offers the capability of securely fastening the wing support 12 to the wing skin 14 even in the event that the wing skin 14 should have a contour, such as indicated by 44, instead of the planar appearance as indicated in FIG. 1. A further distinctive advantage of the transversely located locking means is the fact that rotational (hinge) rotation of the wing skin 14, relative to the wing support 12, is minimized.

Although the present invention has been explained in connection with projections 16 of rectangular cross section and a triangular-based wing support substructure 12, this has been done to simplify the explanation and is only illustrative. Other mating shapes may be similarly employed.

As will be appreciated by virtue of the connection of wing skin structure 14 to wing support substructure 12, without the aid of rivets, high stress points and leakage points between the two structures are eliminated.

Although the present invention has been described in terms of a fastenerless joint for securing an aircraft wing skin to a support structure, it should be appreciated that the invention contemplates other applications. Thus, the following claims envision general utilization of projections from a first laminated structure to form interdigitations with a support substructure to achieve a secure joint therebetween. Specifically, the present invention is envisioned for applications to securing other aircraft skin sections to support substructures, in addition to a wing skin as discussed herein.

It should be understood that the invention is not limited to the exact details of construction shown and described herein, for obvious modifications will occur to persons skilled in the art.

I claim:
1. An expansion fastener comprising:
   a hollow receptacle having
   a) a first hollow section including a continuous wall, and
   b) at least one additional hollowed section integrally extending coaxially from the first section and having slits formed in the wall thereof; and
   a triple interlocking wedge received within the slitted section for expanding the slitted wall thereof, the triple wedge including a first central wedge member having
   a) at least one tapered surface for contacting a mating tapered surface within the wall of the slitted section,
   b) the tapered surface being ridged for engaging a mating ridge surface within the wall of the slitted section;
   two wedge members adapted to be driven into the slitted section alongside the central first wedge member, each of the latter wedge members having an inwardly tapering rippled sidewall adapted to securely engage a mating rippled surface formed i the wall of the slitted section;
   the driving insertion of the first central wedge member resulting in independent expansion of the receptacle in a first direction, and further wherein the driving insertion of the latter two wedge members into the receptacle results in independent expansion of the receptacle in a second direction orthogonal to the first direction.

2. The structure set forth in claim 1 together with still another slitted section similar to the first and integrally extending coaxially from the first continuous section in a direction opposite that of the first slitted section for receiving another triple wedge.

3. The structure set forth in claim 1 wherein the central wedge member has opposite ridged surfaces for engaging mating ridged surfaces in the wall of the slitted section.

4. The structure set forth in claim 1 wherein the height of the two wedge members is less than that of the central wedge member thereby preventing interfering contact between the two wedge members and the receptacle in the first direction.

5. An expansion fastener comprising:
a hollow receptacle having
   a) a first section including a continuous wall, and
   b) at least one additional hollowed section integrally extending coaxially from the first section and having slits formed in the wall thereof; and
a triple interlocking wedge received within the slitted section for expanding the slitted wall thereof, the triple wedge including a first central wedge member having
   a) tapered surfaces for contacting mating tapered surfaces within the wall of the slitted section,
   b) at least one tapered surface being ridged for engaging a mating ridged surface within the wall of the slitted section;
two wedge members adapted to be driven into the slitted section alongside the central first wedge member, each of the latter wedge members having an inwardly tapering rippled sidewall adapted to securely engage a mating rippled surface formed in the wall of the slitted section;
the driving insertion of the first central wedge member resulting in independent expansion of the receptacle in a first direction, and further wherein the driving insertion of the latter wedge members into the receptacle results in independent expansion of the receptacle in a second direction orthogonal to the first direction;
the receptacle further including still another slitted section similar to the first and integrally extending coaxially from the first continuous section in a direction opposite that of the first slitted section for receiving another triple wedge.

6. The expansion fastener set forth in claim 5 together with a first structural member having at least one pair of aligned hollow projections;
a second hollowed structural member seated against the first structural member in the space between projections;
the expansion receptacle inserted through the projections and the hollowed structural member for locking them together;
the triple wedge expanding the receptacle for securing the first and second structural members together.

7. The structure set forth in claim 6 wherein the first structural member is an aircraft skin structure and the second structural member is a support substructure, removal of the triple wedge from the receptacle permitting disassembly of the skin structure from the support substructure.

8. A method for expanding a receptacle of a fastener comprising:
driving a first central wedge into an open slitted end of the receptacle which has an internal rippled surface, the wedge having a substantially mating rippled surface tapered in a first direction for limiting receptacle expansion in the first direction and for engaging the mating rippled surface and securing the first wedge in the receptacle;
driving two additional wedges into the receptacle laterally alongside the central wedge, the additional wedges and the slitted end having substantially mating rippled surfaces tapered in a second orthogonal direction for independently limiting receptacle expansion in the second direction and for securing the two additional wedges in the receptacle.

* * * * *